(12) United States Patent
Folie et al.

(10) Patent No.: US 9,698,641 B2
(45) Date of Patent: Jul. 4, 2017

(54) ACTIVE SEGMENT OF A WIND TURBINE ROTARY ELECTRIC MACHINE, ROTARY ELECTRIC MACHINE, AND WIND TURBINE

(71) Applicant: WINDFIN B.V., Leimuiden (NL)

(72) Inventors: Georg Folie, Wiesen (IT); Matteo Casazza, Val di Vizze (IT); Maddalena Renier, Salorno (IT)

(73) Assignee: WINDFIN B.V., Leimuiden (NL)

( * ) Notice: Subject to any disclaimer, the term of this patent is extended or adjusted under 35 U.S.C. 154(b) by 370 days.

(21) Appl. No.: 14/416,487

(22) PCT Filed: Jul. 25, 2013

(86) PCT No.: PCT/IB2013/056116
§ 371 (c)(1),
(2) Date: Jan. 22, 2015

(87) PCT Pub. No.: WO2014/016802
PCT Pub. Date: Jan. 30, 2014

(65) Prior Publication Data
US 2015/0171686 A1 Jun. 18, 2015

(30) Foreign Application Priority Data

Jul. 25, 2012 (IT) .............................. MI2012A1301

(51) Int. Cl.
*H02K 9/00* (2006.01)
*H02K 3/24* (2006.01)
(Continued)

(52) U.S. Cl.
CPC ............... *H02K 3/24* (2013.01); *H02K 9/005* (2013.01); *H02K 9/20* (2013.01); *H02K 9/22* (2013.01);
(Continued)

(58) Field of Classification Search
CPC .......... H02K 9/19; H02K 1/20; H02K 7/1838; H02K 3/24; H02K 7/183; H02K 9/005;
(Continued)

(56) References Cited

U.S. PATENT DOCUMENTS 1,607,288 A * 11/1926 Laffoon ................... H02K 9/19
310/54
6,676,122 B1  1/2004 Wobben
(Continued)

FOREIGN PATENT DOCUMENTS

EP  2109208 A1  10/2009
EP  2136077 A2  12/2009
(Continued)

OTHER PUBLICATIONS

International Search Report and Written Opinion for International Application No. PCT/IB2013/056116 dated Feb. 6, 2014.
(Continued)

*Primary Examiner* — Thanh Lam
(74) *Attorney, Agent, or Firm* — Neal, Gerber & Eisenberg LLP

(57) ABSTRACT

An active segment of a wind turbine rotary electric machine is selectively and prismatically connectable to a tubular support of a rotary electric machine, extends between two opposite ends to form, together with other active segments, an annular active part about an axis of rotation, and has a laminated pack; at least one active member extending axially and fitted inside a seat of the laminated pack; and at least one heat exchange member located at one end to cool one end of the active member.

18 Claims, 4 Drawing Sheets

(51) Int. Cl.
*H02K 9/20* (2006.01)
*H02K 9/22* (2006.01)
*H02K 1/12* (2006.01)
*H02K 1/20* (2006.01)
*H02K 7/18* (2006.01)
*H02K 9/19* (2006.01)

(52) U.S. Cl.
CPC .............. *H02K 1/12* (2013.01); *H02K 1/20* (2013.01); *H02K 7/1838* (2013.01); *H02K 9/19* (2013.01); *H02K 2213/12* (2013.01); *Y02E 10/725* (2013.01)

(58) Field of Classification Search
CPC .. H02K 9/22; F03D 80/60; F03D 9/00; F03D 11/00; F03D 1/00
USPC ............... 310/52, 54, 58–59, 94; 290/44, 55
See application file for complete search history.

(56) References Cited

U.S. PATENT DOCUMENTS

| | | | |
|---|---|---|---|
| 7,057,305 | B2 | 6/2006 | Kruger-Gotzmann et al. |
| 7,161,260 | B2 | 1/2007 | Kruger-Gotzmann et al. |
| 7,168,251 | B1 | 1/2007 | Janssen |
| 7,594,800 | B2 | 9/2009 | Teipen |
| 7,808,149 | B2 | 10/2010 | Pabst et al. |
| 7,936,102 | B2 | 5/2011 | Pabst et al. |
| 8,358,189 | B2 * | 1/2013 | Kaessner ............... H02K 15/03 29/598 |
| 2002/0089242 | A1 | 7/2002 | Liang et al. |
| 2007/0024132 | A1 | 2/2007 | Salamah et al. |
| 2009/0261668 | A1 * | 10/2009 | Mantere .................. H02K 5/20 310/54 |
| 2010/0123318 | A1 | 5/2010 | Casazza et al. |
| 2011/0101700 | A1 * | 5/2011 | Stiesdal ................. H02K 1/148 290/55 |
| 2011/0109095 | A1 * | 5/2011 | Stiesdal .................. H02K 1/20 290/55 |
| 2011/0248584 | A1 | 10/2011 | Le Besnerais |
| 2012/0074798 | A1 * | 3/2012 | Bywaters ................ H02K 1/16 310/54 |

FOREIGN PATENT DOCUMENTS

| | | |
|---|---|---|
| EP | 2187506 A1 | 5/2010 |
| EP | 2320080 A1 | 5/2011 |
| EP | 2354542 A1 | 8/2011 |
| EP | 2378631 A1 | 10/2011 |
| EP | 2878070 | 10/2016 |
| GB | 1450501 | 9/1976 |
| JP | 2004208461 A | 7/2004 |

OTHER PUBLICATIONS

International Preliminary Report on Patentability (Form PCT/IPEA/409) for International Application No. PCT/IB2013/056116 dated Sep. 10, 2014.

Mexican Office Action for Mexican Patent Application No. MX/a/2015/001163 dated Sep. 28, 2016, 2 pages.

* cited by examiner

ACTIVE SEGMENT OF A WIND TURBINE ROTARY ELECTRIC MACHINE, ROTARY ELECTRIC MACHINE, AND WIND TURBINE

PRIORITY CLAIM

This application is a national stage application of PCT/IB2013/056116, filed on Jul. 25, 2013, which claims the benefit of and priority to Italian Patent Application No. MI2012A001301, filed on Jul. 25, 2012, the entire contents of which are each incorporated by reference herein.

BACKGROUND

To produce electric energy using wind turbines, rotary electric machines are used to convert kinetic energy to electric energy. In this field, segmented rotary electric machines are also employed (i.e., in which the facing active parts moving with respect to one another are defined by axial active segments, which slide axially into and out of respective seats on respective supports of the rotary electric machine). A segmented rotary electric machine is described in Applicant's U.S. Pat. No. 7,936,102 B1 and U.S. Pat. No. 7,808,149 B2 and U.S. Published Patent Application No. 2010/0123318 A1. This rotary electric machine configuration permits relatively easy assembly of the active parts and relatively easy replacement of the active segments when servicing the machine.

In a wind turbine, the rotary electric machine serves to convert kinetic energy to electric energy. Part of the kinetic energy converted by the rotary electric machine, however, is converted to heat, which must be removed to optimize efficiency of the machine. It should thus be appreciated that as the temperature increases, the efficiency of the rotary electric machine decreases.

The electric energy produced is subsequently transformed in phase and frequency in static electric machines, which are also cooled to optimize performance.

For this purpose, the wind turbines described in U.S. Pat. No. 7,057,305, U.S. Pat. No. 7,161,260, U.S. Pat. No. 6,676,122, U.S. Pat. No. 7,594,800 and EP Patent No. 2,136,077 comprise air cooling systems. More specifically, EP Patent No. 2,136,077 describes a wind turbine comprising a rotary electric machine; a rotary assembly with a hub; blades fitted to the hub; a nacelle supporting the rotary electric machine; and a forced-air cooling system, which feeds air successively through the hub, the rotary electric machine and the nacelle. In other words, air flows in through a first opening in the hub, and out through a second opening in the rear of the nacelle.

Air cooling systems provide for fairly good performance of rotary electric machines on wind turbines installed in relatively mild or cold climates.

In hot climates, on the other hand, liquid cooling systems are required.

U.S. Pat. No. 7,168,251 B1 describes a wind turbine comprising a closed-circuit, liquid cooling system.

Wind turbines must often be designed and built with a cooling system designed according to the climate of where the wind turbine is installed (i.e., to maximize power and efficiency of the electric machine according to the climate at the installation site).

Designing and building wind turbines according to the climate at the installation site, the scale economies made possible by mass production of the wind turbine component parts are greatly reduced.

In this respect, known cooling systems are not particularly versatile and perform relatively poorly as regards to cooling the electric generator.

To eliminate this drawback, Applicant's EP Patent Application No. 2,354,542 proposes a rotor liquid cooling system with a tubular structure fitted with heat exchangers.

This system is relatively highly effective and versatile, but the heat exchangers increase the weight of the rotor and are located on the opposite side to the active segments.

The active segments as disclosed in documents EP Patent No. 2,378,631 and EP Patent No. 2,109,208 normally comprise a laminated pack; and an active member normally defined by a coil or a block of permanent magnets and housed inside a seat on the laminated pack.

One drawback observed by the Applicant is the failure of certain known cooling systems to maintain an even temperature along the active segment. That, the temperature along the active segment varies widely between a maximum and minimum value.

SUMMARY

The present disclosure relates to an active segment of a wind turbine electric machine.

It is an advantage of the present disclosure to provide an active segment of a wind turbine rotary electric machine, configured to eliminate certain of the drawbacks of certain of the known art.

According to the present disclosure, there is provided an active segment of a wind turbine rotary electric machine, wherein the active segment is selectively and prismatically connectable to a tubular structure of a rotary electric machine, extends between two opposite ends to form, together with other active segments, an annular active part about an axis of rotation, and comprises a laminated pack; at least one active member, which extends axially, is fitted inside a seat of the laminated pack, and comprises an electric coil having two U-shaped portions projecting from opposite sides of the laminated pack and defining two opposite ends of the active member; the active segment being characterized by comprising at least two heat pipes located at the opposite sides to cool the opposite ends of the active member partly inside the gaps formed by the U-shaped portions and the laminated pack; wherein each heat pipe has one end located close to a cooling channel.

Tests by the Applicant show the temperature to be highest at the ends of the active member. So, providing a heat exchanger at one end of an active segment cools the relative hottest area of the active segment, provides for a more even temperature along the active segment, and improves performance of the rotary electric machine.

In certain embodiments, each heat exchange member is straight for relatively easy handling and installation.

In certain embodiments of the present disclosure, the heat exchange member extends in a direction crosswise to the axial direction, such as radially with respect to the axis of rotation.

As a result, heat is removed crosswise to the axial direction along which the heat-generating active member extends.

In certain embodiments of the present disclosure, the heat exchange member is positioned contacting the active member. As a result, part of the heat is transmitted by direct conduction between the end of the active member and the heat exchange member.

To optimize its efficiency, cooling channels are formed in the rotary electric machine. Locating one end of the heat exchange member close to a cooling channel improves cooling of the active part. The cooling channel may be traversed by liquid or gas. If the cooling channel is traversed by a liquid, the heat exchange member is positioned contacting the heat exchanger. If the cooling channel is traversed by a gas, the heat exchange member may relatively easily be exposed to the gas flow along the cooling channel. For example, the air gap of the rotary electric machine may define an annular cooling channel when traversed by gas, such as air. Moreover, the air gap is located close to the active member, so one end of the heat exchange member may relatively easily be exposed to the gas flow.

Alternatively, the active segment comprises at least one cooling channel housed at least partly in the laminated pack. So, this cooling channel may also be used relatively easily for the heat exchange member.

In certain embodiments, the active segment comprises a pipe, which extends parallel to the active member, is housed in the laminated pack, and defines the cooling channel. As a result, the cooling channel is able to cool the whole of the active member, the laminated pack, and the ends of the active member. The pipe may be housed inside a groove on the laminated pack, or be fully enclosed in the laminated pack.

In certain embodiments of the present disclosure, the pipe has two opposite ends fitted with members configured to compress the laminated pack.

The pipe defining the cooling channel thus also acts as a tie.

In certain embodiments, each active segment comprises a plurality of parallel cooling channels housed in the laminated pack. Distributing the cooling channels inside the laminated pack provides for distributing the 'cold' areas as required.

In certain embodiments, the active segment comprises a plurality of pipes housed in the laminated pack and defining respective cooling channels.

These cooling channels may be connected to one another by bends located outside the laminated pack and therefore relatively easily reached by the heat exchange member. The heat exchange member is also positioned contacting a bend to conduct heat.

It is a further advantage of the present disclosure to provide a rotary electric machine configured to eliminate certain of the drawbacks of certain of the known art.

According to the present disclosure, there is provided a segmented rotary electric machine for a wind turbine, comprising a rotor, and a stator which comprises a tubular structure extending about an axis of rotation, and a plurality of active segments selectively and prismatically connectable axially to the tubular structure to form an annular active part; and wherein each active segment is configured to be cooled as described herein.

The temperature of the rotary electric machine can thus be reduced at opposite ends.

It is a further advantage of the present disclosure to provide a wind turbine configured to produce electric energy, and configured to eliminate certain of the drawbacks of certain of the known art.

According to the present disclosure, there is provided a wind turbine configured to produce electric energy, and comprising a rotary electric machine as described above; and a liquid cooling system comprising a stationary circuit connected to each active segment.

The liquid cooling system provides for greatly reducing the temperature, and so greatly improving the efficiency, of the rotary electric machine.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the attached drawings, in which.

DETAILED DESCRIPTION

Figure 1:
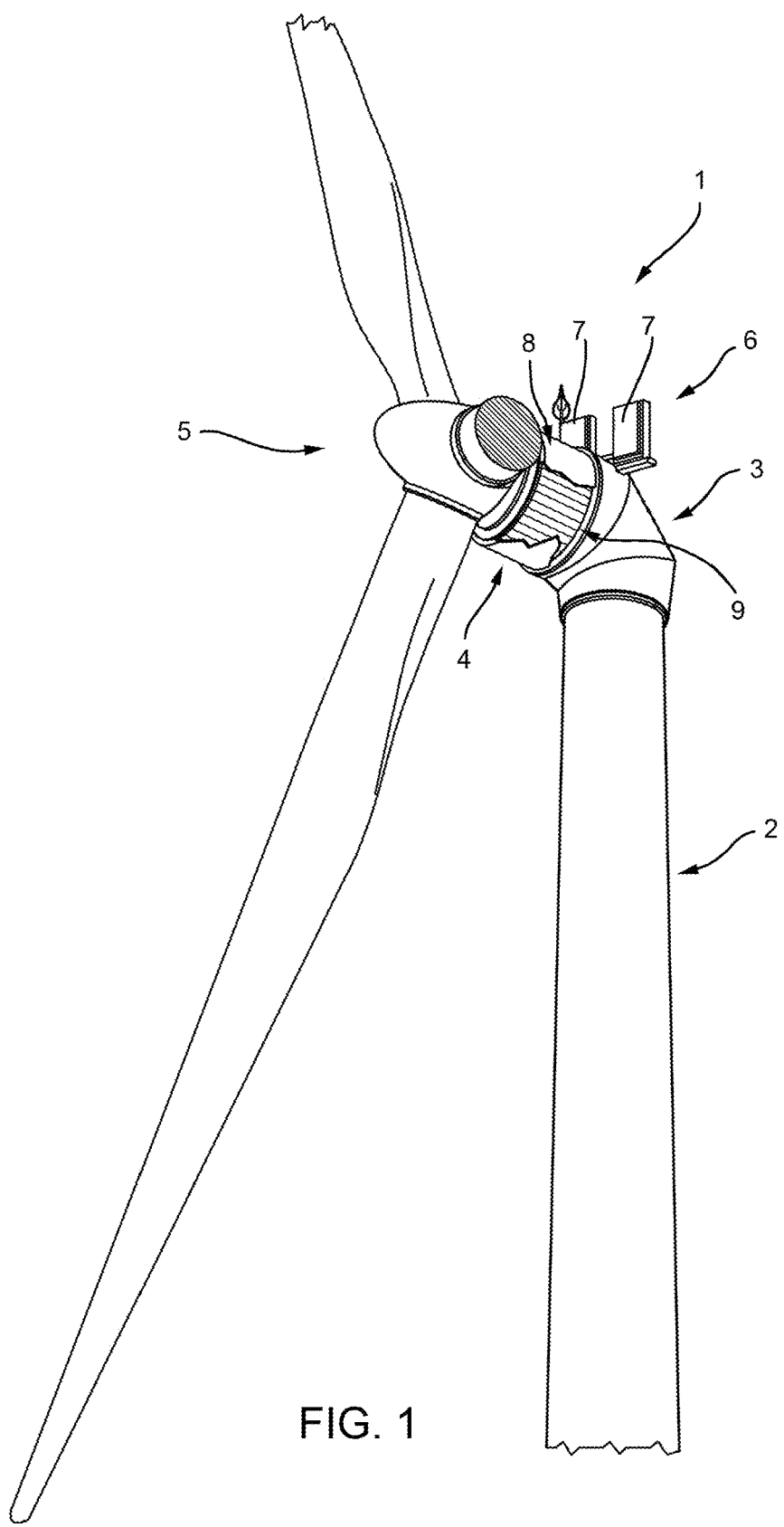
FIG. 1 shows a view in perspective, with parts removed for clarity, of a wind turbine equipped with a segmented rotary electric machine featuring active segments in accordance with the present disclosure.

Referring now to the example embodiments of the present disclosure illustrated in FIGS. 1 to 7, number 1 in FIG. 1 indicates as a whole a wind turbine configured to produce electric energy. Wind turbine 1 comprises a pylon 2; a nacelle 3 mounted to rotate on pylon 2; a rotary electric machine 4 fitted to nacelle 3; and a blade assembly 5 connected to rotary electric machine 4.

Wind turbine 1 also comprises a liquid cooling system 6, of which FIG. 1 only shows two heat exchangers 7 fitted to the outside of nacelle 3.

In the example shown, rotary electric machine 4 comprises a stator 8 fixed to nacelle 3; and a rotor 9, which is supported to rotate with respect to stator 8, is located inside stator 8, and is connected rigidly to blade assembly 5 to define a direct-drive system. It is understood that the present disclosure also applies to configurations other than the one shown and described in detail (i.e., to configurations in which the rotor surrounds the stator, or in which a drive is interposed between the blade assembly and the rotor).

Rotary electric machine 4 is, in certain embodiments, a synchronous, permanent-magnet rotary electric machine.

Figure 2:
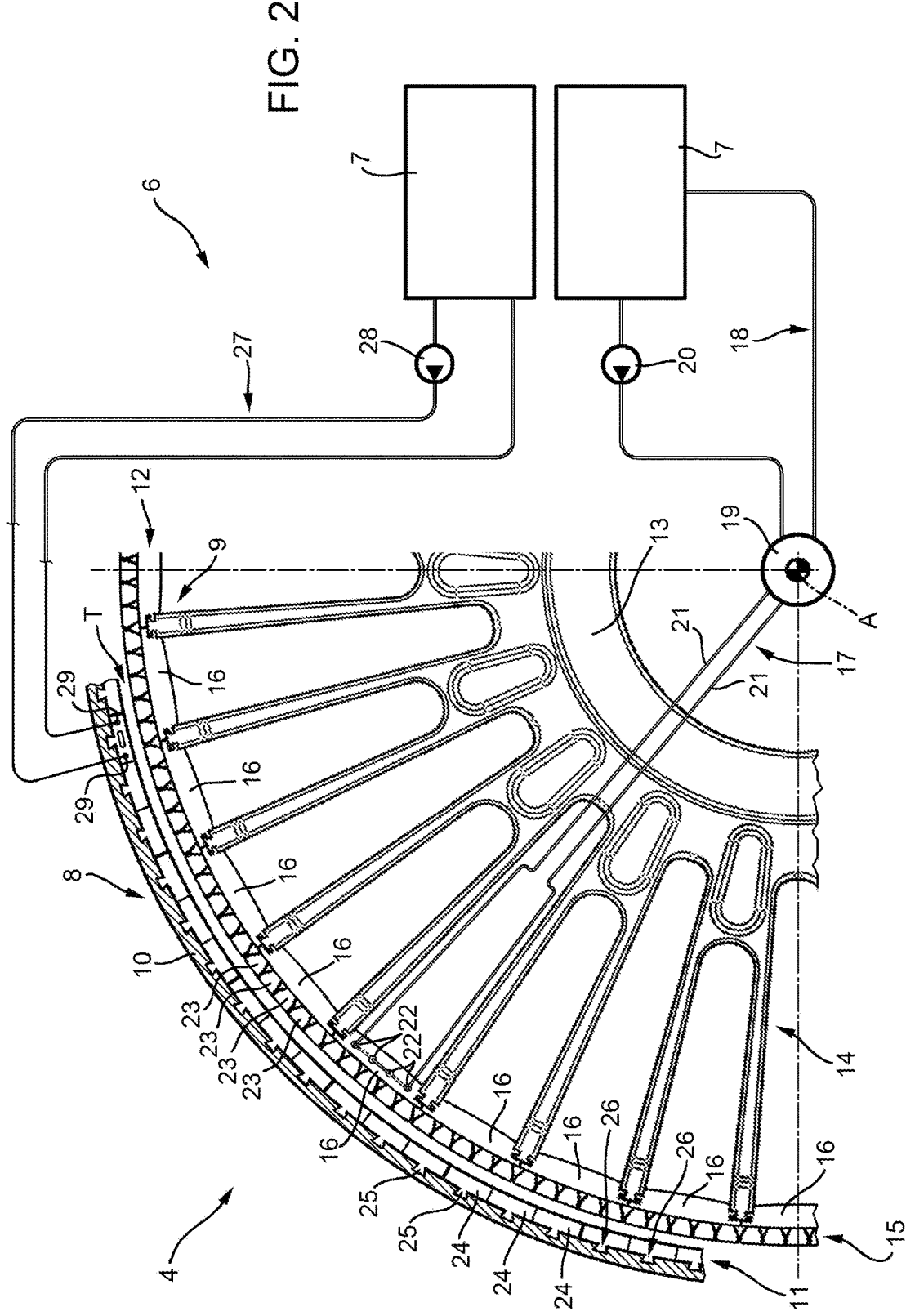
FIG. 2 shows a partly schematic elevation, with parts removed for clarity, of the segmented rotary electric machine installed on the FIG. 1 wind turbine.

As shown in FIG. 2, rotary electric machine 4 is connected to the liquid cooling system. Rotary electric machine 4 is tubular about an axis of rotation A. In the example shown, stator 8 comprises a tubular structure 10; and an annular active part 11 fitted to tubular structure 10. Rotor 9 comprises a tubular structure 12; a hub 13; a radial structure 14 configured to connect hub 13 to tubular structure 12; and an active part 15, which is fitted to tubular structure 12, faces active part 11, and is separated from the active part by an air gap T.

In the example shown, tubular structure 12 comprises a plurality of sectors 16 arranged about axis of rotation A and substantially adjacent to one another circumferentially. Each sector 16 is fitted to radial structure 14. Rotor 9 is connected to liquid cooling system 6, which comprises a rotary circuit portion 17 and a stationary circuit portion 18. Rotor 9 actually comprises rotary circuit portion 17 of liquid cooling system 6. Liquid cooling system 6 schematically comprises a rotary liquid distributor 19 to which rotary circuit portion 17 and stationary circuit portion 18 are connected; a liquid circulating pump 20 located along stationary circuit portion 18; and at least one of heat exchangers 7, which are also located along stationary circuit portion 18.

Liquid cooling system 6 generally comprises a plurality of rotary circuit portions 17, each associated with a respective sector 16. Each rotary circuit portion 17 comprises two, respectively liquid feed and liquid return, branches 21, which, in the example shown, extend radially at radial structure 14.

Tubular structure 12 comprises a plurality of cooling channels 22 formed in tubular structure 12 itself. In the example shown, each sector 16 has cooling channels 22 parallel to axis of rotation A. The cooling channels 22 formed in tubular structure 12 serve to conduct air, or, as in the example shown in the attached drawings, form an integral part of liquid cooling system 6. In other words, rotary circuit portion 17 is defined partly by the axially-extending cooling channels 22.

Each sector 16 is configured to support at least one active segment 23 and, in the example shown, supports five active segments 23, each extending parallel to axis of rotation A, and each of which is insertable axially into and removable axially from tubular structure 12. Each active segment 23 is defined by a magnetic guide, by substantially at least one laminated pack, and by an active member defined by permanent magnets (not shown in the attached drawings).

Active part IIIs defined by a plurality of active segments 24 fitted to tubular structure 10. Each active segment 24 and tubular structure 10 are configured to form an axial prismatic coupling. In the example shown, each active segment 24 comprises a dovetail-shaped rib 25, and tubular structure 10 has a plurality of axial grooves 26 complementary in shape to rib 25.

Each active segment 24 is connected to cooling system 6, which comprises a stationary circuit 27 configured to circulate the cooling liquid, and along which one of heat exchangers 7 and a pump 28 are located. Each active segment 24 comprises cooling channels 29 connected to stationary circuit 27.

Figure 3:
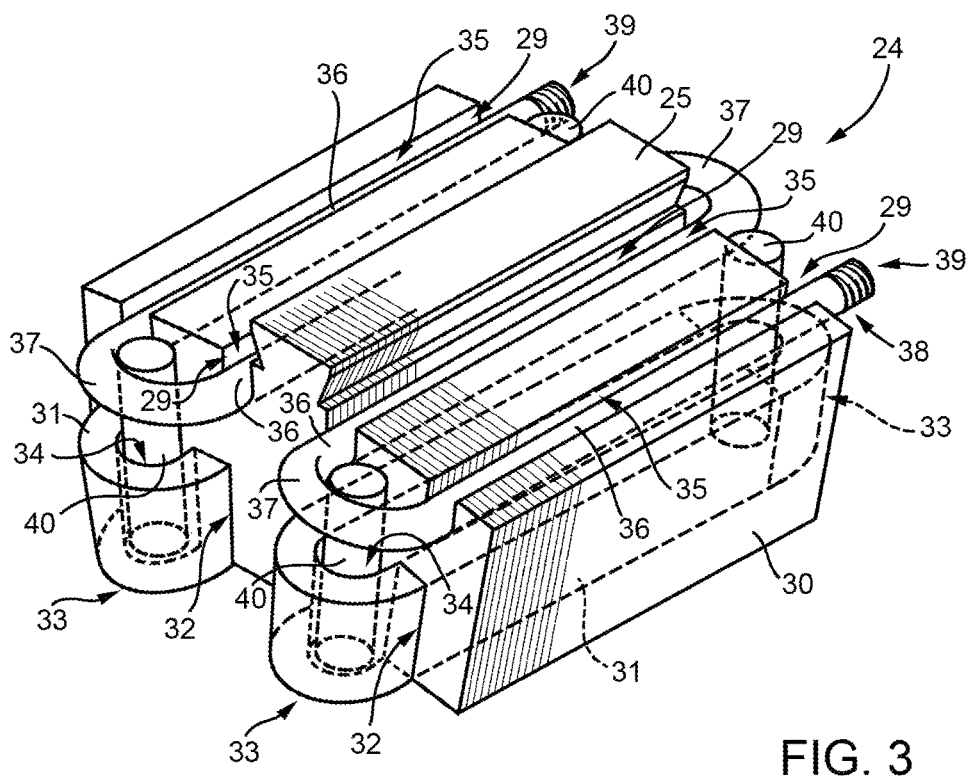
FIG. 3 shows a larger-scale view in perspective, with parts removed for clarity, of an active segment in accordance with the present disclosure.

As shown in FIG. 3, each active segment 24 comprises a laminated pack 30 fitted with an active member 31; and at least one cooling channel 29. Laminated pack 30 is prismatic in shape, and axial seats 32, such as grooves, are formed in it to house the active members and define teeth substantially defining pole pieces of laminated pack 30.

In the example shown, each active member is an electric coil, which is wound about a tooth, (i.e., about a pole piece) is housed in seats 32, and projects axially on opposite sides of laminated pack 30. More specifically, each coil has a U-shaped portion 33, which projects from one face of laminated pack 30 and defines a gap 34 between U-shaped portion 33 and laminated pack 30.

Laminated pack 30 comprises a plurality of grooves 35 formed on the opposite side to seats 32. Each groove 35 houses a cooling channel 29 substantially defined by a pipe 36, which is connected to the other pipes 36 defining the other cooling channels 29 by U-shaped bends 37 to form a coil 38, which terminates with attachments 39 configured to connect to stationary circuit 27.

Each active member 31 is connected at the end to a heat exchange member 40. That is, each U-shaped portion 33 of the electric coil is positioned contacting a heat exchange member 40. More specifically, heat exchange member 40 is located inside gap 34, and is, in certain embodiments, supported by the electric coil. Heat exchange member 40 is substantially cylindrical and is positioned substantially radially. Heat exchange member 40 is, in certain embodiments, a so-called 'heat pipe' (i.e., a hollow pipe or cylinder of heat-conducting metal, closed at the ends and containing a small amount of cooling liquid; the rest of the pipe is filled with the cooling liquid vapour, so no other gases are present). A heat pipe serves to transfer heat from its hot end to its cold end by evaporation and condensation of the cooling liquid. The hot end, contacting a heat source, yields heat to the cooling liquid, which vaporizes and so increases the vapour pressure in the pipe. The latent vaporization heat absorbed by the cooling liquid reduces the temperature at the hot end of the pipe. The vapour pressure close to the hot end being higher than the balanced pressure at the cold end, vapour is transferred rapidly to the cold end, where the vapour in excess of equilibrium condenses, yielding heat to the cold end.

Figure 4:
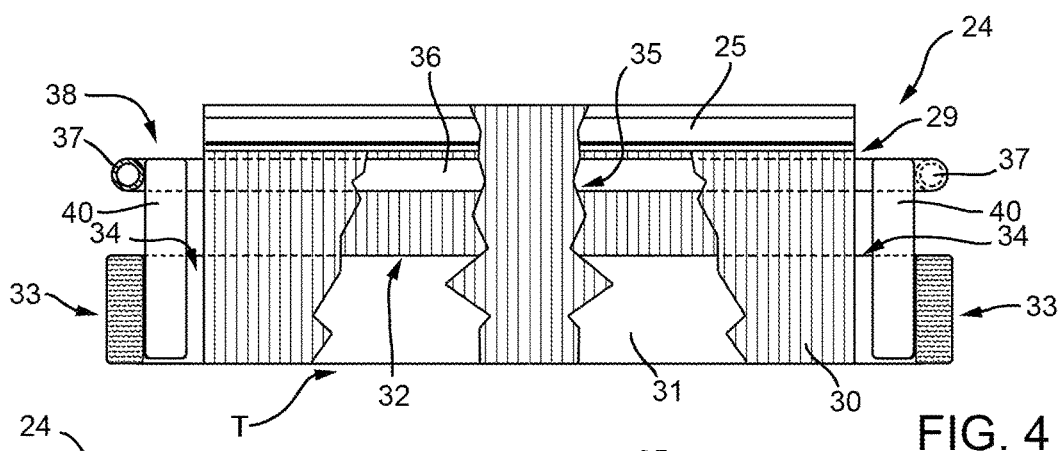
FIG. 4 shows a partly sectioned side view, with parts removed for clarity, of the active segment in FIG. 3.

In the example shown, and with reference to FIG. 4, heat exchange member 40 therefore has a 'hot' end contacting the electric coil or, more generally speaking, active member 31, and a 'cold' end located close to cooling channel 29 or contacting coil 38.

The area inside U-shaped portion 33 of the electric coil is particularly hot, so the heat exchange member 40 located in this area provides for rapid cooling.

Figure 5:
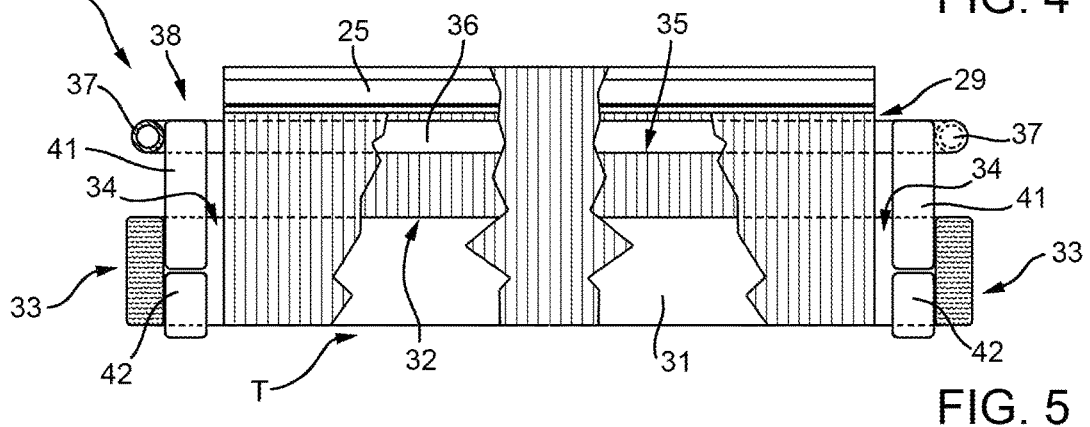
FIG. 5 shows a partly sectioned side view, with parts removed for clarity, of a variation of the active segment in FIGS. 3 and 4.

In the FIG. 5 variation, each U-shaped portion 33 of the electric coil is connected to two heat exchange members 41 and 42. Heat exchange member 41 extends from U-shaped portion 33 to a cooling channel 29. Heat exchange member 42 extends in the same direction as member 41 but on the opposite side, and more specifically from U-shaped portion 33 to air gap T, which, when traversed by air or gas in general, acts as a cooling channel configured to cool heat exchange member 42.

Figure 6:
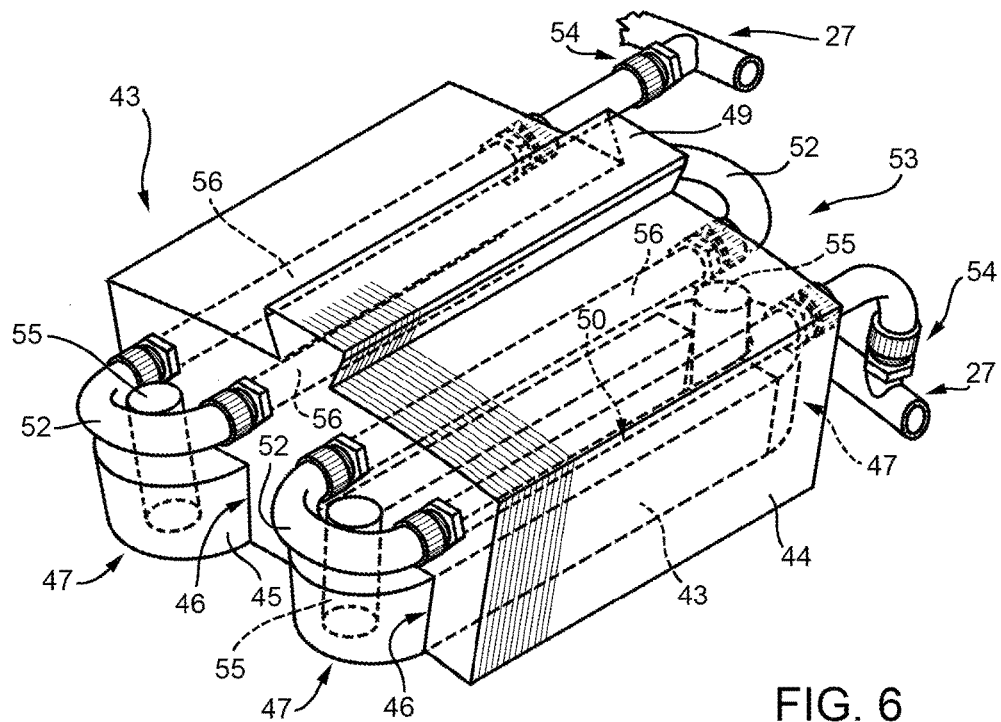
FIG. 6 shows a larger-scale view in perspective, with parts removed for clarity, of an active segment in accordance with an alternative embodiment of the present disclosure.

Number 43 in the FIG. 6 embodiment indicates an active segment comprising a laminated pack 44 supporting two active members 45.

Like segment 24 in FIG. 3, laminated pack 44 has seats 46 configured to house active members 45 and which, in the example shown, are defined by electric coils. Each electric coil forms a U-shaped portion 47, which projects from one face of laminated pack 44 and defines a gap 48 between U-shaped portion 47 and laminated pack 44, as shown more clearly in FIG. 7.

Laminated pack 44 has a rib 49 configured to form an axial prismatic coupling with tubular structure 10.

Figure 7:
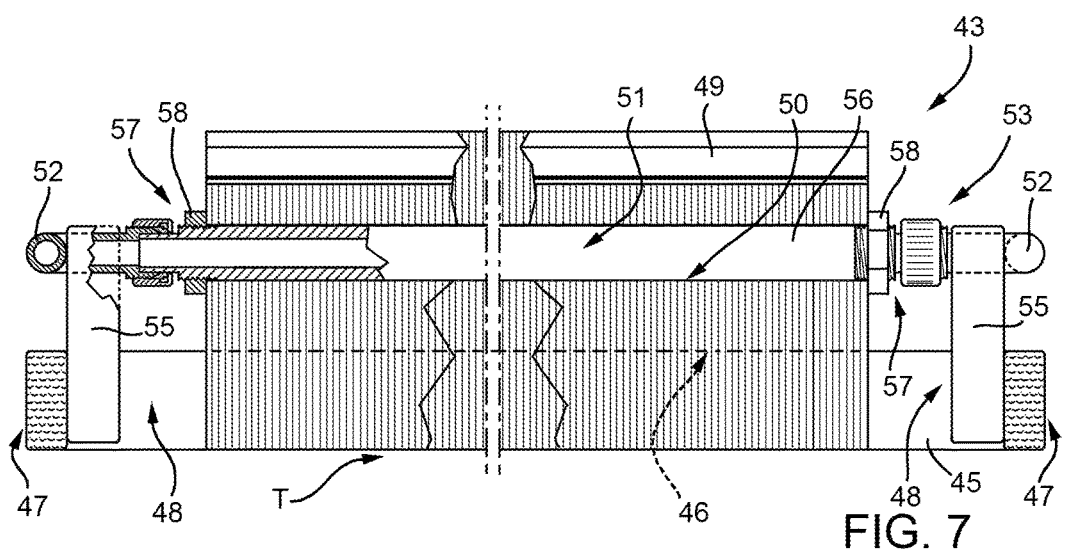
FIG. 7 shows a larger-scale, partly sectioned side view, with parts removed for clarity, of the active segment in FIG. 6.

As shown in FIG. 7, laminated pack 44 also comprises a plurality of axial through openings 50. Active segment 43 differs from active segment 24 by comprising openings 50, each of which houses a cooling channel 51 connected to the other cooling channels 51 by U-shaped bends 52 to form a coil 53 terminating with attachments 54 configured to connect to stationary circuit 27 (FIG. 2).

Active member 45 is connected at the end to a heat exchange member 55. That is, each U-shaped portion 47 of the electric coil is positioned contacting a heat exchange member 55. More specifically, heat exchange member 55 is located inside gap 48, and is supported by the electric coil.

In the example shown, and with reference to FIG. 7, heat exchange member 55 therefore has a 'hot' end contacting the electric coil or, more generally speaking, active member 45, and a 'cold' end located close to cooling channel 51 or contacting coil 53.

Each cooling channel is substantially defined by a pipe 56 housed inside a respective axial opening 50. In the example shown, each pipe 56 has two opposite ends 57, which project from the laminated pack to connect to the other pipes 56 and stationary circuit 27 (FIG. 2).

The projecting ends 57 of each pipe 56 are, in certain embodiments, threaded and engaged respectively by two ring nuts 58, which serve to compress laminated pack 44. In fact, in this case, pipes 56 may act as ties normally used to produce laminated packs.

Clearly, changes may be made to the active segment according to the present disclosure without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine rotary electric machine active segment which extends between two opposite ends to define, together with other wind turbine rotary electric machine active segments, an annular active part about an axis of rotation, said wind turbine rotary electric machine active segment comprising:
 a laminated pack; and
 an active member which extends axially, which is fitted inside a seat of the laminated pack and which includes:
  an electric coil having a first U-shaped portion projecting from a first side of the laminated pack, and defining a first end of the active member, and
  a heat pipe located at the first side of the laminated pack to cool the first end of the active member, said heat pipe being partly inside a gap defined by the first U-shaped portion and the laminated pack, wherein the heat pipe has one end located within a designated proximity to a cooling channel.

2. The wind turbine rotary electric machine active segment of claim 1, wherein the heat pipe is substantially straight.

3. The wind turbine rotary electric machine active segment of claim 1, wherein the heat pipe extends in a direction crosswise to an axial direction.

4. The wind turbine rotary electric machine active segment of claim 3, wherein the axial direction is radial with respect to the axis of rotation.

5. The wind turbine rotary electric machine active segment of claim 1, wherein the heat pipe is positioned contacting at least part of the active member.

6. The wind turbine rotary electric machine active segment of claim 1, wherein:
 the laminated pack is configured to support a plurality of active members, each active member having a first end projecting from a first side of the laminated pack, and which includes at least one heat pipe at each first end of the active member.

7. The wind turbine rotary electric machine active segment of claim 1, wherein the cooling channel housed is at least partly in the laminated pack.

8. The wind turbine rotary electric machine active segment of claim 7, which includes a pipe which extends parallel to the active member, wherein the pipe is housed in the laminated pack and partially defines the cooling channel.

9. The wind turbine rotary electric machine active segment of claim 8, wherein the pipe is substantially fully enclosed in the laminated pack.

10. The wind turbine rotary electric machine active segment of claim 8, wherein the pipe has two opposite ends fitted with members configured to compress the laminated pack.

11. The wind turbine rotary electric machine active segment of claim 8, which includes a plurality of parallel cooling channels housed in the laminated pack.

12. The wind turbine rotary electric machine active segment of claim 11, which includes a plurality of pipes housed in the laminated pack and defining a plurality of respective cooling channels.

13. The wind turbine rotary electric machine active segment of claim 11, which includes a bend connecting the cooling channels and located outside the laminated pack.

14. The wind turbine rotary electric machine active segment of claim 1, which is selectively and prismatically connectable to a tubular structure of a rotary electric machine.

15. The wind turbine rotary electric machine active segment of claim 1, wherein:
 the electric coil has a second U-shaped portion projecting from a second, opposite side of the laminated pack, and defining a second, opposite end of the active member, and
 the active member includes at least two heat pipes located at the opposite sides of the laminated pack to cool the opposite ends of the active member, said at least two heat pipes being partly inside respective gaps defined by the U-shaped portions and the laminated pack, wherein each heat pipe has one end located within the designated proximity to the cooling channel.

16. A segmented wind turbine rotary electric machine comprising:
 a rotor; and
 a stator which includes:
 a tubular structure extending about an axis of rotation, and
 a plurality of active segments selectively and prismatically connectable axially to the tubular structure to form an annular active part, wherein at least one active segment includes:
 a laminated pack; and
 an active member which extends axially, which is fitted inside a seat of the laminated pack and which includes:
  an electric coil having a first U-shaped portion projecting from a first side of the laminated pack, and defining a first end of the active member, and
  a heat pipe located at the first side of the laminated pack to cool the first end of the active member, said heat pipe being partly inside a gap defined by the first U-shaped portion and the laminated pack, wherein the heat pipe has one end located within a designated proximity to a cooling channel.

17. The segmented wind turbine rotary electric machine of claim 16, wherein:
 the electric coil has a second U-shaped portion projecting from a second, opposite side of the laminated pack, and defining a second, opposite end of the active member, and
 the active member includes at least two heat pipes located at the opposite sides of the laminated pack to cool the opposite ends of the active member, said at least two heat pipes being partly inside respective gaps defined by the U-shaped portions and the laminated pack, wherein each heat pipe has one end located within the designated proximity to the cooling channel.

18. The segmented wind turbine rotary electric machine of claim 16, which includes a liquid cooling system including a stationary circuit connected to said at least one active segment.

\* \* \* \* \*